(12) United States Patent
Yurochko (10) Patent No.: US 7,708,416 B2
(45) Date of Patent: May 4, 2010

(54) LIGHTING AND USABILITY FEATURES FOR KEY STRUCTURES AND KEYPADS ON COMPUTING DEVICES

(76) Inventor: Michael Yurochko, 103 University Ave., Los Gatos, CA (US) 95030

( * ) Notice: Subject to any disclaimer, the term of this patent is extended or adjusted under 35 U.S.C. 154(b) by 0 days.

(21) Appl. No.: 11/779,792

(22) Filed: Jul. 18, 2007

(65) Prior Publication Data

US 2008/0013300 A1 Jan. 17, 2008

Related U.S. Application Data (63) Continuation of application No. 11/203,809, filed on Aug. 13, 2005, now Pat. No. 7,275,836, and a continuation of application No. 11/203,808, filed on Aug. 13, 2005, now Pat. No. 7,294,802, and a continuation of application No. 11/203,824, filed on Aug. 13, 2005.

(51) Int. Cl.
*F21V 33/00* (2006.01)
(52) U.S. Cl. ............... 362/29; 362/23; 40/452; 200/314
(58) Field of Classification Search ............ 362/23, 362/29, 30; 200/314; 40/452, 453
See application file for complete search history.

(56) References Cited

U.S. PATENT DOCUMENTS

| | | |
|---|---|---|
| 3,744,034 A | 7/1973 | Paul |
| 3,937,952 A | 2/1976 | Ripley et al. |
| 4,359,612 A | 11/1982 | Rooney |
| 4,359,613 A | 11/1982 | Rooney |
| 4,559,705 A | 12/1985 | Hodge et al. |
| 4,564,751 A | 1/1986 | Alley et al. |
| RE32,419 E | 5/1987 | Rooney |
| 4,679,951 A | 7/1987 | King et al. |
| 4,762,227 A | 8/1988 | Patterson |
| 4,802,210 A | 1/1989 | Spencer et al. |
| 4,847,798 A | 7/1989 | Kurashima |
| 4,860,372 A | 8/1989 | Kuzunuki et al. |
| 4,916,441 A | 4/1990 | Gombrich |
| 4,972,496 A | 11/1990 | Sklarew |
| D312,628 S | 12/1990 | Yokoi et al. |
| D313,401 S | 1/1991 | Tanabe |
| D313,413 S | 1/1991 | Langton |
| 5,002,184 A | 3/1991 | Lloyd |
| 5,040,296 A | 8/1991 | Yerger |
| 5,049,862 A | 9/1991 | Dao et al. |
| 5,067,573 A | 11/1991 | Uchida |

(Continued)

FOREIGN PATENT DOCUMENTS

DE 3235752 3/1984

(Continued)

OTHER PUBLICATIONS

"Nokia 9500 Up Close", from www.phonescoop.com, Jun. 27, 2006, 2 pages.

(Continued)

*Primary Examiner*—Laura Tso
(74) *Attorney, Agent, or Firm*—Mahamedi Paradice Kreisman LLP (57) ABSTRACT

A keypad is provided for a computing device. The keypad includes one or more lighting devices or mechanisms for illuminating a plurality of keys structures. In an embodiment, the plurality of key structures are formed from a milky material.

20 Claims, 11 Drawing Sheets

U.S. PATENT DOCUMENTS

| | | |
|---|---|---|
| 5,128,829 A | 7/1992 | Loew |
| 5,138,119 A | 8/1992 | Demeo |
| 5,165,415 A | 11/1992 | Wallace et al. |
| 5,180,891 A | 1/1993 | Trumbo |
| 5,181,029 A | 1/1993 | Kim |
| 5,205,017 A | 4/1993 | Wang |
| 5,231,381 A | 7/1993 | Duwaer |
| 5,253,142 A | 10/1993 | Weng |
| 5,266,949 A | 11/1993 | Rossi |
| 5,274,371 A | 12/1993 | Yang et al. |
| 5,280,283 A | 1/1994 | Raasch et al. |
| 5,283,862 A | 2/1994 | Lund |
| 5,305,394 A | 4/1994 | Tanaka |
| D355,165 S | 2/1995 | Sakaguchi et al. |
| 5,389,745 A | 2/1995 | Sakamoto |
| 5,401,917 A | 3/1995 | Yoshida et al. |
| 5,401,927 A | 3/1995 | Lundell et al. |
| 5,410,141 A | 4/1995 | Koenck et al. |
| 5,426,449 A | 6/1995 | Danziger |
| D359,920 S | 7/1995 | Sakamoto |
| 5,430,248 A | 7/1995 | Levy |
| 5,434,929 A | 7/1995 | Beernick et al. |
| D361,562 S | 8/1995 | Beltz |
| 5,444,192 A | 8/1995 | Shetye et al. |
| 5,448,433 A | 9/1995 | Morehouse et al. |
| 5,452,371 A | 9/1995 | Bozinovic et al. |
| 5,457,454 A | 10/1995 | Sugano |
| 5,471,023 A | 11/1995 | Kaizu et al. |
| D366,463 S | 1/1996 | Ive et al. |
| 5,489,924 A | 2/1996 | Shima et al. |
| D368,079 S | 3/1996 | Ive et al. |
| 5,500,643 A | 3/1996 | Grant |
| 5,506,749 A | 4/1996 | Matsuda |
| 5,528,743 A | 6/1996 | Tou et al. |
| 5,530,234 A | 6/1996 | Loh et al. |
| 5,534,892 A | 7/1996 | Tagawa |
| 5,548,477 A | 8/1996 | Kumar et al. |
| 5,550,715 A | 8/1996 | Hawkins |
| 5,555,157 A | 9/1996 | Moller et al. |
| 5,563,631 A | 10/1996 | Masunaga |
| 5,564,850 A | 10/1996 | Nagaoka |
| 5,576,502 A | 11/1996 | Fukushima et al. |
| 5,606,712 A | 2/1997 | Hidaka |
| 5,611,031 A | 3/1997 | Hertzfeld et al. |
| 5,615,284 A | 3/1997 | Rhyne et al. |
| 5,621,817 A | 4/1997 | Bozinovic et al. |
| 5,622,789 A | 4/1997 | Young |
| 5,630,148 A | 5/1997 | Norris |
| 5,635,682 A | 6/1997 | Cherdak et al. |
| 5,638,257 A | 6/1997 | Kumar et al. |
| 5,642,110 A | 6/1997 | Raasch et al. |
| D381,021 S | 7/1997 | Williams et al. |
| 5,646,649 A | 7/1997 | Iwata et al. |
| 5,657,459 A | 8/1997 | Yanagisawa et al. |
| 5,661,641 A | 8/1997 | Shindo |
| D383,756 S | 9/1997 | Henderson et al. |
| 5,682,182 A | 10/1997 | Tsubodaka |
| 5,698,822 A | 12/1997 | Haneda et al. |
| D390,509 S | 2/1998 | Antzinas et al. |
| 5,717,565 A | 2/1998 | Raasch |
| D392,968 S | 3/1998 | Johansson |
| 5,737,183 A | 4/1998 | Kobayashi et al. |
| D394,449 S | 5/1998 | Shimizu |
| 5,757,681 A | 5/1998 | Suzuki et al. |
| 5,760,347 A | 6/1998 | Notarianni et al. |
| 5,786,061 A | 7/1998 | Banfield |
| D398,307 S | 9/1998 | Collins |
| 5,810,461 A | 9/1998 | Ive et al. |
| 5,818,437 A | 10/1998 | Grover et al. |
| 5,821,510 A | 10/1998 | Cohen et al. |
| 5,825,353 A | 10/1998 | Will |
| 5,831,555 A | 11/1998 | Yu et al. |
| 5,831,613 A | 11/1998 | Johnston et al. |
| 5,841,901 A | 11/1998 | Arai et al. |
| D402,572 S | 12/1998 | Han |
| 5,848,298 A | 12/1998 | Steere, Jr. et al. |
| 5,889,512 A | 3/1999 | Moller et al. |
| D408,021 S | 4/1999 | Haitami et al. |
| 5,892,503 A | 4/1999 | Kim |
| D411,179 S | 6/1999 | Toyosato |
| D411,181 S | 6/1999 | Tamaki et al. |
| 5,913,629 A | 6/1999 | Hazzard |
| 5,914,708 A | 6/1999 | La Grange et al. |
| 5,915,228 A | 6/1999 | Kunihiro et al. |
| 5,936,614 A | 8/1999 | An et al. |
| 5,941,648 A | 8/1999 | Robinson et al. |
| 5,942,177 A | 8/1999 | Banfield |
| 5,949,408 A | 9/1999 | Kang et al. |
| 5,953,205 A | 9/1999 | Kambayashi et al. |
| 5,954,437 A | 9/1999 | Wen-Hung |
| D416,001 S | 11/1999 | Tal et al. |
| D416,256 S | 11/1999 | Griffin et al. |
| 5,975,711 A | 11/1999 | Parker et al. |
| 5,995,026 A | 11/1999 | Sellers |
| D417,657 S | 12/1999 | Matsumoto |
| 6,014,009 A | 1/2000 | Wierzbicki et al. |
| D420,351 S | 2/2000 | Waldner |
| D420,987 S | 2/2000 | Miyahara et al. |
| 6,023,779 A | 2/2000 | Fullam et al. |
| 6,034,685 A | 3/2000 | Kuriyama et al. |
| D422,271 S | 4/2000 | Kawashima |
| D423,468 S | 4/2000 | Jenkins |
| 6,046,730 A | 4/2000 | Bowen et al. |
| 6,049,796 A | 4/2000 | Siitonen et al. |
| 6,050,735 A | 4/2000 | Hazzard |
| 6,052,070 A | 4/2000 | Kivela et al. |
| 6,052,279 A | 4/2000 | Friend et al. |
| D424,533 S | 5/2000 | Kandalepas |
| D426,236 S | 6/2000 | Kim et al. |
| 6,091,956 A | 7/2000 | Hollenberg |
| 6,094,197 A | 7/2000 | Buxton et al. |
| 6,100,875 A | 8/2000 | Goodman et al. |
| 6,102,594 A | 8/2000 | Strom |
| 6,102,721 A | 8/2000 | Seto et al. |
| 6,103,979 A | 8/2000 | Motoyama et al. |
| 6,107,997 A | 8/2000 | Ure |
| 6,108,200 A | 8/2000 | Fullerton |
| 6,115,248 A | 9/2000 | Canova et al. |
| D432,511 S | 10/2000 | Eckholm |
| D433,017 S | 10/2000 | Martinez |
| 6,129,430 A | 10/2000 | Wu |
| 6,148,261 A | 11/2000 | Obradovich et al. |
| 6,151,012 A | 11/2000 | Bullister |
| 6,151,206 A | 11/2000 | Kato et al. |
| 6,157,323 A | 12/2000 | Tso et al. |
| D436,591 S | 1/2001 | Abston et al. |
| D436,963 S | 1/2001 | Kim et al. |
| 6,170,024 B1 | 1/2001 | Wakeland et al. |
| 6,178,087 B1 | 1/2001 | Cho et al. |
| 6,181,284 B1 | 1/2001 | Madsen et al. |
| 6,195,589 B1 | 2/2001 | Ketcham |
| D440,542 S | 4/2001 | Hawkins et al. |
| 6,212,412 B1 | 4/2001 | Rogers et al. |
| D441,733 S | 5/2001 | Do et al. |
| 6,239,968 B1 | 5/2001 | Kim et al. |
| 6,243,789 B1 | 6/2001 | Hasbun et al. |
| 6,249,276 B1 | 6/2001 | Ohno |
| 6,266,240 B1 | 7/2001 | Urban et al. |
| 6,278,442 B1 | 8/2001 | Griffin et al. |
| 6,283,777 B1 | 9/2001 | Canova et al. |
| D451,079 S | 11/2001 | Ali |
| 6,346,973 B1 | 2/2002 | Shibamoto et al. |
| 6,351,255 B1 | 2/2002 | Moreno |
| D454,349 S | 3/2002 | Makidera et al. |

| | | |
|---|---|---|
| D454,849 S | 3/2002 | Eckholm |
| 6,356,442 B1 | 3/2002 | Lunsford |
| 6,374,277 B2 | 4/2002 | Vong et al. |
| D456,794 S | 5/2002 | Laverick et al. |
| 6,396,482 B1 | 5/2002 | Griffin et al. |
| D458,239 S | 6/2002 | Shim et al. |
| D459,327 S | 6/2002 | Ali |
| D460,068 S | 7/2002 | Lanzaro et al. |
| 6,426,197 B1 | 7/2002 | Change |
| 6,452,588 B2 | 9/2002 | Griffin et al. |
| 6,459,968 B1 | 10/2002 | Kochie |
| 6,489,950 B1 | 12/2002 | Griffin et al. |
| 6,507,336 B1 | 1/2003 | Lunsford |
| 6,535,199 B1 | 3/2003 | Canova, Jr. et al. |
| D472,551 S | 4/2003 | Griffin |
| D473,226 S | 4/2003 | Griffin |
| 6,554,442 B2 | 4/2003 | Chou |
| D476,985 S | 7/2003 | Griffin |
| D478,585 S | 8/2003 | Griffin |
| 6,609,805 B1 | 8/2003 | Nelson |
| 6,611,254 B1 | 8/2003 | Griffin et al. |
| 6,611,255 B2 | 8/2003 | Griffin et al. |
| 6,626,551 B2 | 9/2003 | Funamoto et al. |
| 6,641,315 B2 | 11/2003 | King et al. |
| 6,677,931 B2 | 1/2004 | Chi et al. |
| 6,679,613 B2 | 1/2004 | Mabuchi |
| 6,717,083 B2 | 4/2004 | Chen et al. |
| D490,076 S | 5/2004 | Griffin |
| 6,743,993 B1 | 6/2004 | Clark et al. |
| 6,776,497 B1 | 8/2004 | Huppi et al. |
| 6,786,661 B2 | 9/2004 | King et al. |
| 6,808,325 B2 | 10/2004 | King et al. |
| D497,907 S | 11/2004 | Griffin |
| 6,867,763 B2 | 3/2005 | Griffin et al. |
| 6,873,317 B1 | 3/2005 | Griffin et al. |
| 6,891,529 B2 | 5/2005 | Ladouceur et al. |
| 6,918,707 B2 | 7/2005 | King et al. |
| 6,919,879 B2 | 7/2005 | Griffin et al. |
| 6,921,221 B2 | 7/2005 | King et al. |
| 6,923,583 B2 | 8/2005 | King et al. |
| 6,940,490 B1 | 9/2005 | Kim et al. |
| 6,981,791 B2 | 1/2006 | Higashiyama |
| 6,987,466 B1 | 1/2006 | Welch et al. |
| 7,027,036 B2 | 4/2006 | Yang |
| 7,196,693 B2 | 3/2007 | Chien et al. |
| 7,275,836 B2 | 10/2007 | Yurochko |
| 7,294,802 B2 | 11/2007 | Yurochko |
| 2002/0021562 A1 | 2/2002 | Tholin et al. |
| 2002/0196618 A1 | 12/2002 | Douzono et al. |
| 2003/0112620 A1 | 6/2003 | Prindle |
| 2004/0145573 A1 | 7/2004 | Han et al. |
| 2007/0034494 A1 | 2/2007 | Yurochko |
| 2007/0035522 A1 | 2/2007 | Yurochko et al. |
| 2007/0035962 A1 | 2/2007 | Yurochko |
| 2008/0013300 A1 | 1/2008 | Yurochko |

FOREIGN PATENT DOCUMENTS

| | | |
|---|---|---|
| EP | 0760291 A2 | 3/1997 |
| EP | 1143327 A1 | 10/2001 |
| EP | 1523021 A1 | 4/2005 |
| EP | 1569077 A1 | 8/2005 |
| WO | WO98/01876 A1 | 1/1998 |
| WO | WO99/37025 A1 | 7/1999 |
| WO | WO00/30381 A1 | 5/2000 |

OTHER PUBLICATIONS

HP iPAQ H4350 Keypad Structure, Mar. 3, 2006, 7 pages.
International Search Report and Written Opinion of the International Searching Authority in International Application PCT/US2006/031663, ISA European Patent Office, Mar. 6, 2007, 11 pgs.
Notice of Allowance dated Apr. 19, 2007 in US2007/0034494A1, 16 pages.
Office Action dated Nov. 2, 2006 in US2007/0034494A1, 7 pages.
Office Action dated Feb. 20, 2009 in US2007/0035522A1, 9 pages.
Office Action dated Sep. 12, 2008 in US2007/0035522A1, 9 pages.

LIGHTING AND USABILITY FEATURES FOR KEY STRUCTURES AND KEYPADS ON COMPUTING DEVICES

RELATED APPLICATION INFORMATION

This application is a continuation of U.S. patent application Ser. No. 11/203,809, filed Aug. 13, 2005 now U.S. Pat. No. 7,275,836 entitled, "LIGHTING AND USABILITY FEATURES FOR KEY STRUCTURES AND KEYPADS ON COMPUTING DEVICES"; of U.S. patent application Ser. No. 11/203,808, filed Aug. 13, 2005 now U.S. Pat. No. 7,294,802 entitled, "LIGHTING AND USABILITY FEATURES FOR KEY STRUCTURES AND KEYPADS ON COMPUTING DEVICES"; and of U.S. patent application Ser. No. 11/203,824, filed Aug. 13, 2005 entitled, "LIGHTING AND USABILITY FEATURES FOR KEY STRUCTURES AND KEYPADS ON COMPUTING DEVICES." All of the aforementioned priority applications are hereby incorporated by reference in their entirety.

TECHNICAL FIELD

Embodiments of the invention relate to key structures and keypads for computing devices. In particular, embodiments of the invention relate to lighting and usability features for key structures and keypads on computing devices.

BACKGROUND

Keypads are important aspects of computing devices. With regard to small form-factor keypads in particular, the keypads tend to establish the overall form-factor of a computing device. The keypad is often a very visible and highly used component of such computing devices.

Messaging devices, in particular, have need for QWERTY style keyboards. Such keyboards are often operated by the user using thumbs. Key size, visibility, and sensation are important characteristics for consideration in the design of small form-factor keyboards. One further consideration is usability of such features in darkened environment. Many users typically need to see some or all keys of a keyboard when thumb typing on a small form factor keyboard, as such devices have closely spaced keys that may require visual coordination.

DETAILED DESCRIPTION

Numerous embodiments are described in this application for enhancing lighting and usability of key structures and keypads of computing devices. It is contemplated that the various features described by this application may be combined in any one of numerous ways.

According to an embodiment, a key structure is provided for a computing device. The key structure is formed from a milky material.

In another embodiment, a keypad is provided for a computing device. The keypad includes one or more lighting devices or mechanisms for illuminating a plurality of keys structures. In an embodiment, the plurality of key structures are formed from a milky material.

One or more embodiments described herein provide a keypad for a computing device. In an embodiment, a plurality of key structures comprise the keypad, and each of the key structures may be referenced by a top end that includes a surface for receiving user-contact and a bottom end that is opposite to the top end. A plurality of discrete light sources may be provided underneath the plurality of key structures, so that the plurality of light sources illuminates each of the key structures from the bottom end. A material provided between the top of each key structure in the plurality of key structures and the plurality of discrete light sources to cause light generated by the plurality of light sources to be transmissive through each key structure.

A keypad is any multi-key assembly. A keyboard is an implementation of a keypad.

As used herein, something is "milky" if it is with creamy body color that dominates the diffracted color. In one embodiment, a resin, key structure or other item is milky if it contains white colored resin, meaning resin having at least some visibly detectable white or off-white material. A material is white if the material contains all the colors of the spectrum.

Diffusion of Bright Light Underlying a Keypad

One or more embodiments described herein provide mechanisms for diffusing bright light provided within a housing of a computing device for purpose of illuminating the device's keypad or keyboard. In particular, some light sources, such as provided by white Light Emitting Diodes (LEDs) emit light that is bright and discrete. The brightness of such lights make their use desirable. But, absent some intervening design for handling the discreteness and brightness of the emitted light, the use of such light sources can result in a keypad being unevenly lit from underneath. In such cases, shadows or cold spots may form on regions that are further away from light sources, while bright or hot spots form on region closes to light sources. Furthermore, factors other than the positioning of light sources may result in the formation of hot and cold spots from the use of discrete light sources 120.

Examples of such other key structure features include shading, colorization, use of different materials or surface materials to form some key structures and not others, and different ornamentations provided on key structures on the keypad.

One or more embodiments described herein include keypad design implementations and mechanisms for diffusing and distributing light emitted from LEDs and other bright and discrete light sources. FIG. 1A-1C, FIG. 2A-2C, and FIG. 3A and 3B illustrate alternative implementations in which diffusive material is used to diffuse emitted light from discrete light sources of a keypad for use with a computing device.

Figure 1A:
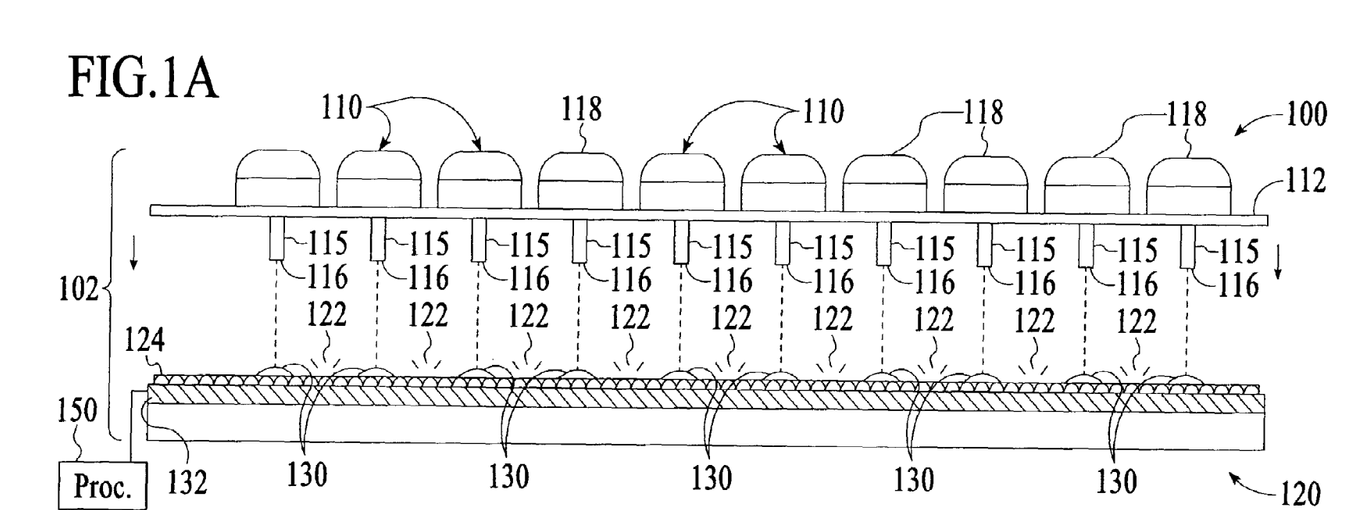
FIG. 1A is an exploded side view of an illuminated keypad for use with a computing device, under an embodiment of the invention.
Figure 1B:
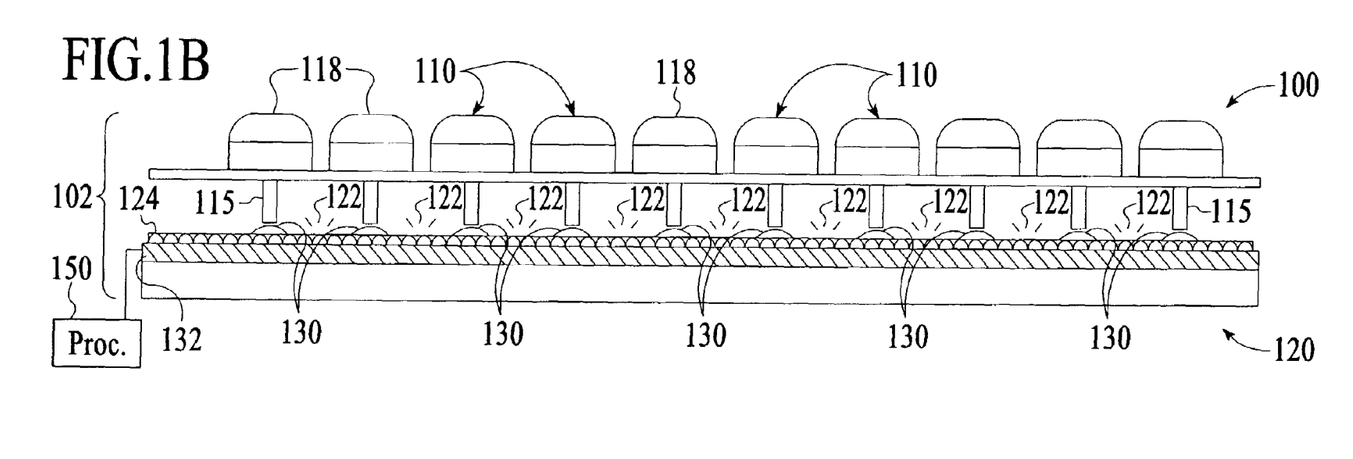
FIG. 1B illustrates a keypad of FIG. 1A in an assembled position, under an embodiment of the invention.

FIG. 1A is an exploded side view of an illuminated stack 102 of a keypad 100 for use with a computing device, under an embodiment of the invention. FIG. 1B illustrates the keypad in an assembled position. An example of a computing device on which the keyboard stack 102 may be implemented is a handheld computing device, such as a personal digital assistant, mobile manager device, or cellular/pocket phone. A specific example of a computing device for use with an embodiment of the invention is a multi-functional cellular device, sometimes called a "smartphone" (e.g. TREO 650 manufactured by PALM, INC.). In such implementations, the keypad 100 has a small form-factor suitable for use with thumb or finger typing.

As shown by FIGS. 1A and 1B, keypad 100 includes a plurality of key structures 110 that overlay a substrate 120 on which a plurality of light sources 122 are provided. The substrate 120 may include electrical contact elements 130 that are actuatable through use of the corresponding key structures 110. A carrier 112 may interconnect the plurality of key structures 110. In one implementation, the carrier 112 and the plurality of key structures 110 form a monolithic component. In another implementation, the carrier 112 and the plurality of key structures 110 may be separately formed elements.

In an embodiment, each key structures 110 includes an actuation member 115 that extends from its bottom end 116. In one implementation, the actuation members 115 are unitarily or integrally formed with the corresponding key structures 110. In another implementation, carrier 112 and key structures 110 are separately formed and combined, and actuation members 115 are unitarily or integrally formed from the carrier 112. In still another embodiment, the actuation members 115 have their own separate carrier and are separately formed from the key structures 110.

Each actuation member 115 may travel inward with compression or insertion of the corresponding key structure 110 to actuate a corresponding one of the electrical contact elements 130. Actuation of anyone of the electrical contact elements 130 triggers a signal that is received and processed by a processor 150 of the computing device. The signal generated from the triggering of any particular key is recognized by the processor 150 as having a value (e.g. alphabet or number value). The electrical contact elements 130 may be provided on a printed circuit board 132, or electrically interconnected substrate (e.g. flex circuit and substrate). In one implementation, the light sources 122 may be provided on a separate sheet 124 that overlays the printed circuit board 132.

In an embodiment, light sources 122 are LEDs, although other types of light sources can be used. The LEDs provide a benefit of providing bright light for their relative size. In a configuration shown by FIG. 1A-1C, the LEDs are disposed evenly between adjacent key structures 110 that form the column or subset of the overall keypad. However, in practice, the distribution of LEDs or other discrete light sources may not be even. For example, in one implementation, 14 LEDs are used to illuminate 40 key structures. In such implementations, some key structures 110 may overlay or be more proximate to individual light sources 122 than other key structures. Regardless of whether LEDs are evenly or unevenly distributed, an illumination of a keyboard formed from the plurality of key structures 110 may carry uneven lighting. For example, some keys may be more lit than others, while individual key structures may have one region that is darker than another.

Accordingly, stack 102 includes components or elements to diffuse or distribute light emitted from light sources 122. The light sources 120 may illuminate individual key structures 110 from their respective bottom end 116. The result is that illumination is provided from a top end 118 of each respective key structure 120. The top end 118 of each individual key structure 110 may be the surface that receives user contact. The top end 118 of each key structure 110 may also display markings, shading, colorization, and/or printed matter. As such, the top end 118 of each key structure 110 corresponds to the surface from which the desired illumination effect is to take place.

In an embodiment, diffusive or light-distributive material is provided with or between the key structures 110 and the light sources 122. Such material may enable individual key structures 110 to be illuminated while at the same time diffusing light emitted from the individual light sources. One result achieved is that a keypad (or desired regions thereof) is illuminated substantially uniformly through diffusion of light from the discrete and bright light sources 122. Such a uniformly lit keypad may be well lit from underneath, without distracting hot or cold spots in the lighting. Accordingly, an embodiment provides that individual key structures 110 of a keypad have the following characteristics: (i) partially transmissive to light so that light entering the bottom end 116 of the key structures is partially carried through that structure; (ii) diffusive or distributive of light, so that some light used to illuminate each key structure 110 is diffused within and/or underneath the key structure 110.

Figure 1C:
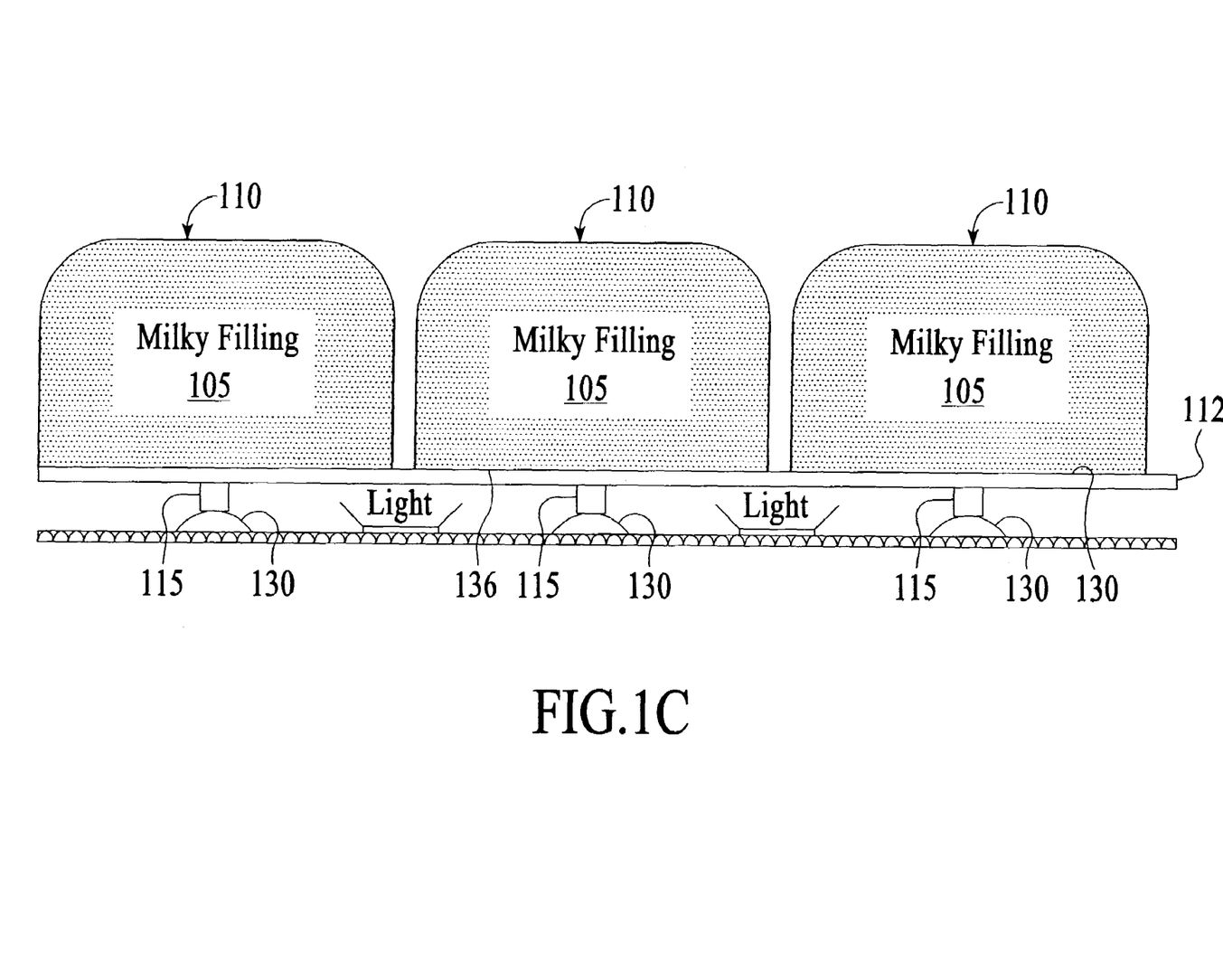
FIG. 1C is a close-up side view of a section of a keyboard shown by FIGS. 1A and 1B, according to an embodiment of the invention.

In an embodiment shown by FIG. 1A-1C, individual key structures are comprised of diffusive material to effect light from light sources 122. Embodiments described herein use milky material to diffuse light that comes in contact with or enters each key structure. Milky material enables light to be diffused while at the same time enabling the light to be transmissive. FIG. 1B illustrates the keypad 100 with key structures 110 formed of milky material or resin overlaying light sources 122 in an operative position. The material of the key structures 110 diffuse and distribute the light emitted from the light sources 122.

FIG. 1C is a close-up side view of a set of key structures 110 shown in FIGS. 1A and 1B. A body 105 of each key structure may be formed from milky resin. Numerous alternatives to resin may be used, including for example, liquid, foam, or other matrix material. The carrier 112 extends underneath the key structures 110. Actuation members 115 extend from the bottom end 136 of each key structure 110 and can travel inward through deflection or movement of the corresponding key structure in order to actuate the electrical contact 130. In an embodiment shown, the electrical contacts are domes that are actuated when corresponding actuation members 115 travel inward and deflect the domes inward. By providing the body 105 of the key structures 110 as being formed from the milky resin, one embodiment provides that no other layer or material is needed to effectuate diffusion or distribution of light emitted from sources 122.

Figure 2A:
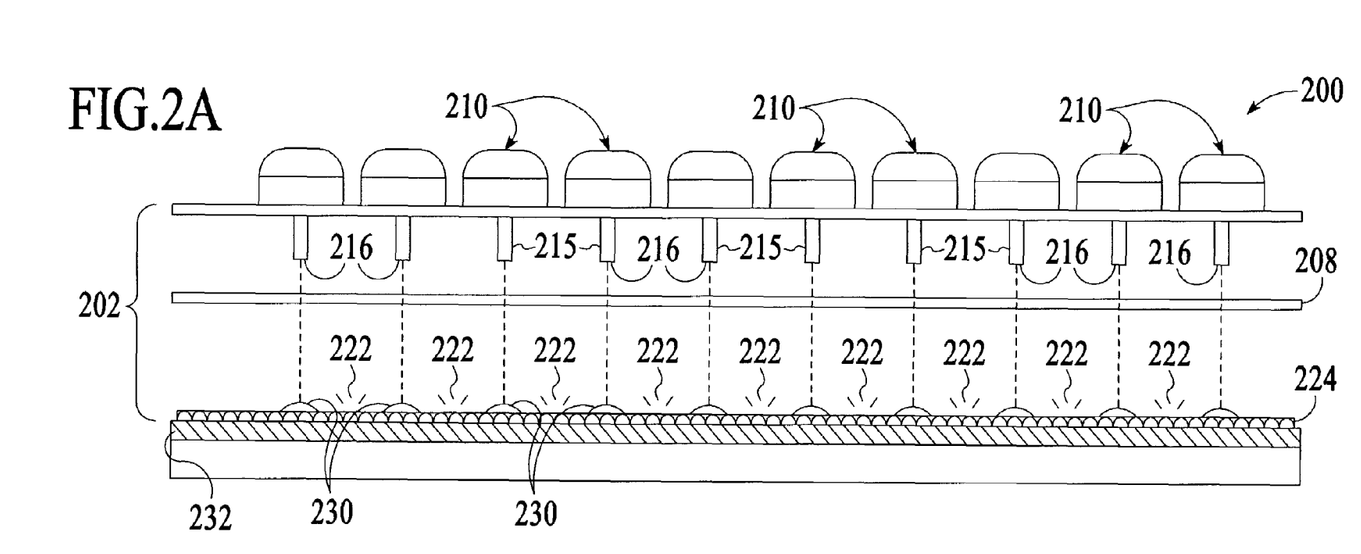
FIG. 2A is an exploded side view of an illuminated keypad for use with a computing device, under another embodiment of the invention.
Figure 2B:
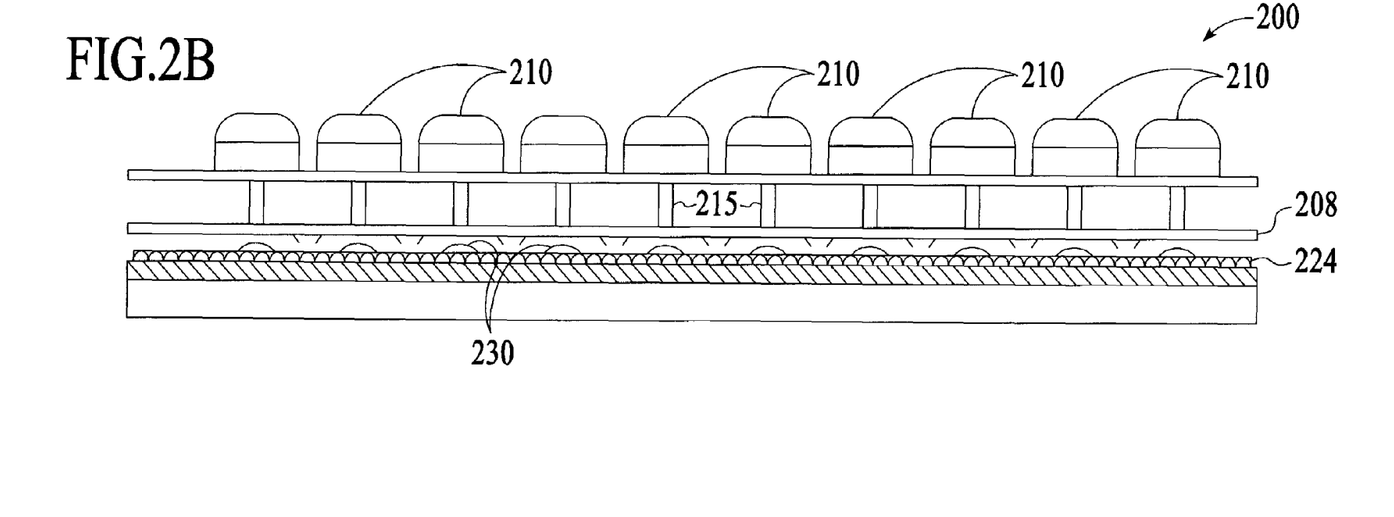
FIG. 2B illustrates a keypad of FIG. 2A in an assembled position, under another embodiment of the invention.
Figure 2C:
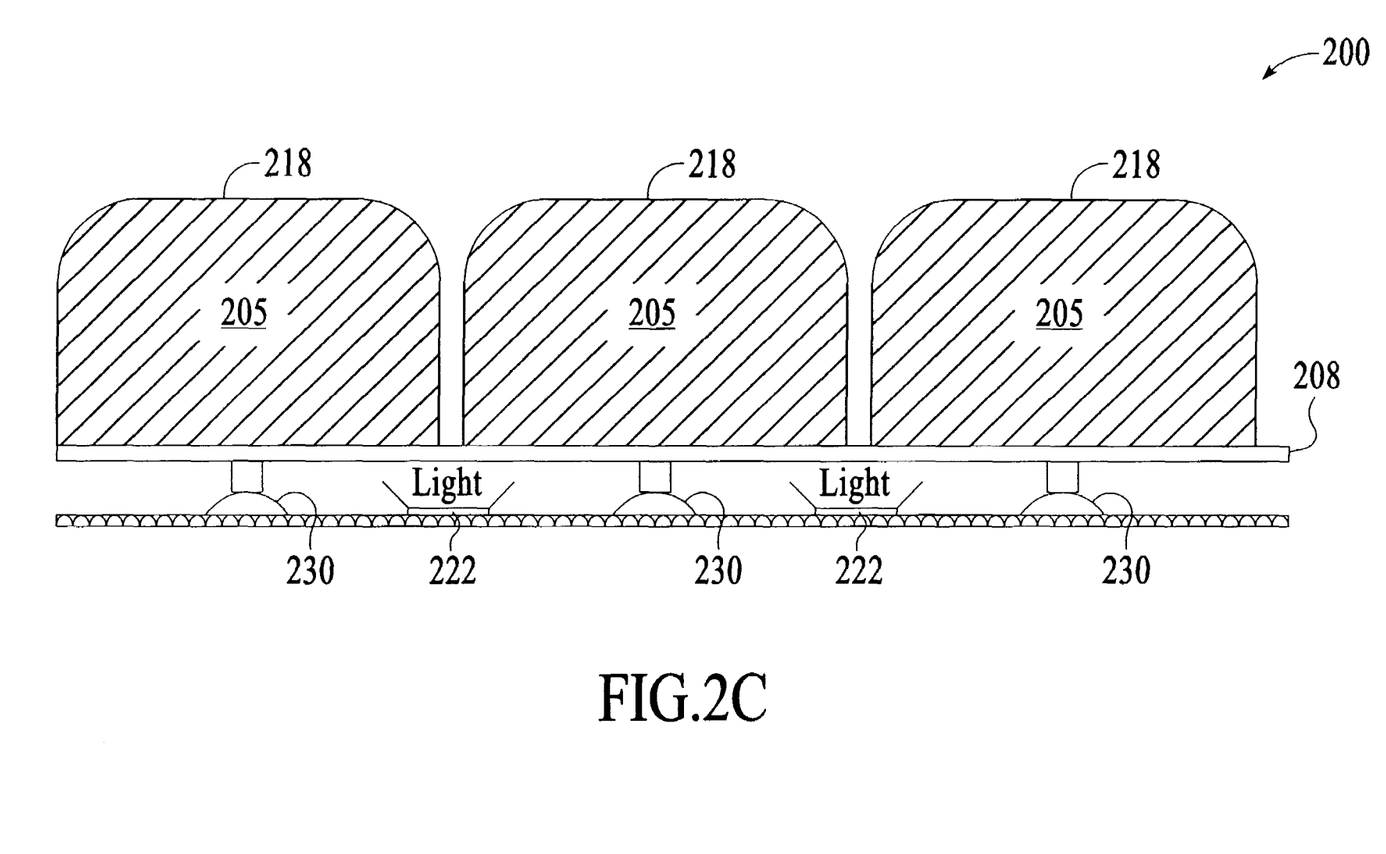
FIG. 2C is a close-up side view of a section of a keyboard shown by FIGS. 2A and 2B, according to another embodiment of the invention.

FIG. 2A-2C illustrate an alternative embodiment in which individual key structures 210 of a keypad 200 are formed from light-transmissive material, but a layer 208 of milky material is disposed between the bottom ends 216 of the key structures 210 and the light sources 222. In FIG. 2A, an exploded view of a stack 202 of the keypad 200 is shown with the key structures 210 overlaid over corresponding contact elements 230.

In FIG. 2B, the stack 202 is shown in the assembled configuration with the layer 208 disposed within the stack 202. The milky layer 208 may be disposed just over the layer carrying the light sources 222. In one implementation, the light sources 222 may be carried on a separate layer 224, and the actuation members 215 may translate into the milky layer 208 in order to electrically actuate a corresponding contact element 230 on a printed circuit board 232.

One embodiment provides for milky layer 208 to be formed of a thin silicon rubber material. The layer 208 may provide a cushion or dampening effect for the actuation members 215 translating into the corresponding contact elements 230, while at the same time forming a diffusion layer for light emitted from light sources 222.

As shown by FIG. 2C, a body 205 of the individual key structures 210 may be non-milky (e.g. clear or translucent). While the body 205 may be non-milky, surface ornamentations, paint, ink or printed material may be provided on a top surface 218 so as to be illuminated by the light from the light sources 222.

Figure 3A:
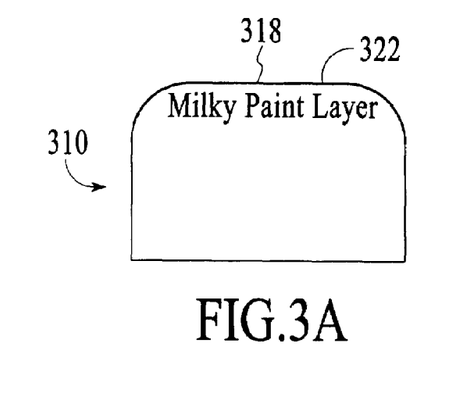
FIG. 3A and FIG. 3B illustrate different key structure designs, under an embodiment of the invention.
Figure 3B:
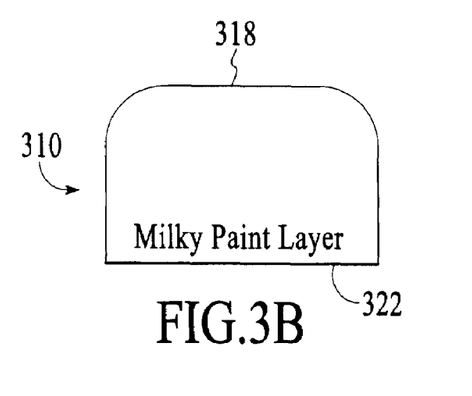

FIGS. 3A and 3B is a side view of an alternative key structure design in which a milky layer is thinly disposed, under an embodiment of the invention. In an embodiment of FIG. 3A, a top surface 318 of a key structure 310 is provided a paint layer 322. The paint layer 322 may include, at least partially, a milky color. Additional surface ornamentations may be provided on the key structure in a manner that creates a desired illuminative effect. FIG. 3B illustrates a painted or formed layer underneath the carrier 208 (FIG. 2C) that adjoins individual key structures 310. Other embodiments may provide a milky paint on a top surface (facing upward) of the carrier 312 with ink or other decorative material provided on either the top surface 318 or underneath the structure at a thickness of or near the carrier 208 (FIG. 2C).

Light Distribution

As an alternative or addition to diffusing light emitted from light sources underlying a keypad, one or more embodiments of the invention contemplate distributing light from light sources. A difference between diffusion of light and distribution of light sources is that light from a source is diffused when it is made less discrete and more spread out, while light from a discrete source is maintained relatively discrete but distributed to more places in discrete form. FIG. 4A-4D illustrate use of polarization material to distribute discrete light sources underlying a keypad of a computing device. One result achieved by the embodiments shown is that light is distributed more evenly underneath a keyboard.

Figure 4A:
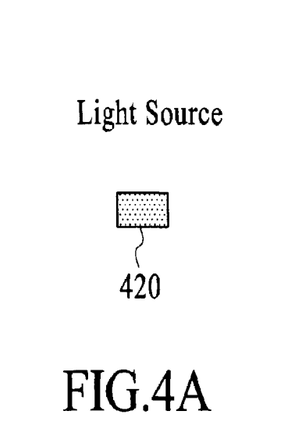
FIG. 4A to FIG. 4D illustrate use of polarization material to distribute discrete light sources underlying a keypad of a computing device, under an embodiment of the invention.
Figure 4B:
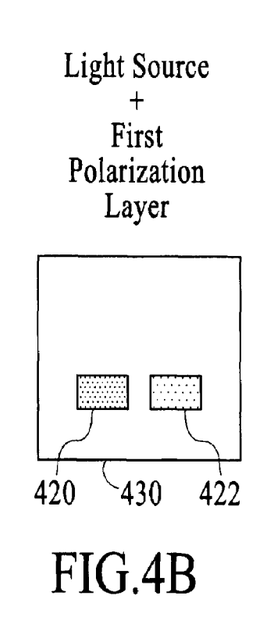

In FIG. 4A, a single light source 420 is shown prior to application of a polarization material. In FIG. 4B, the light source 420 is overlaid by a first polarization material 430. The first polarization material 430 serves to create an apparent light 422 source adjacent to the original light source 420. The apparent light source 422 is not a real light source, but a filtered reflection created by the application of the first polarization material 430. The orientation of the first polarization material 430 uses a filter that creates the apparent light source 422 in a particular direction with respect to the original light source 420.

Figure 4C:
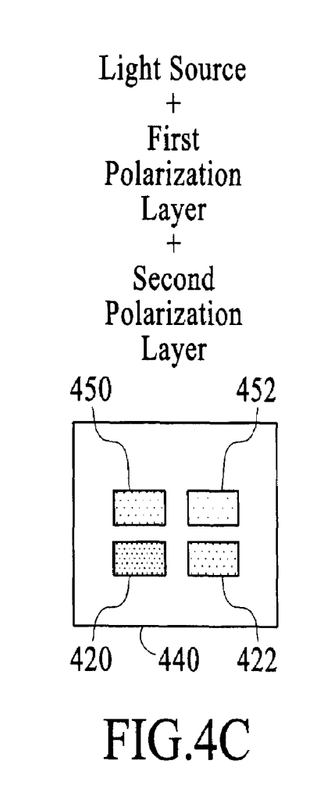

In FIG. 4C, the light source 420 and the first polarization material 430 are applied a second polarization material 440. The second polarization material 440 overlays the first polarization material 430. In one embodiment, the second polarization material 440 uses a filter that creates a second set of apparent light sources 450, 452 in a direction that is orthogonal to the direction that first polarization material creates the apparent light source 422. For example, the first polarization material 430 may use a horizontal filter that distributes the original light source 420 in one of the horizontal directions. The second polarization material 440 may use a vertical filter that distributes the original light source 420 and the apparent light source 422 created by the first polarization material vertically.

In FIG. 4C, one of the second set of apparent light sources 440 is reflected off the original light source 420, while the other apparent light source 452 is reflected off the apparent light source 422 created by the first polarization layer. In the example shown, application of the first polarization material 430 and the second polarization material 440 quadruples the original light source 420, in that the original light source is provided three apparent light sources 422, 450, and 452.

Figure 4D:
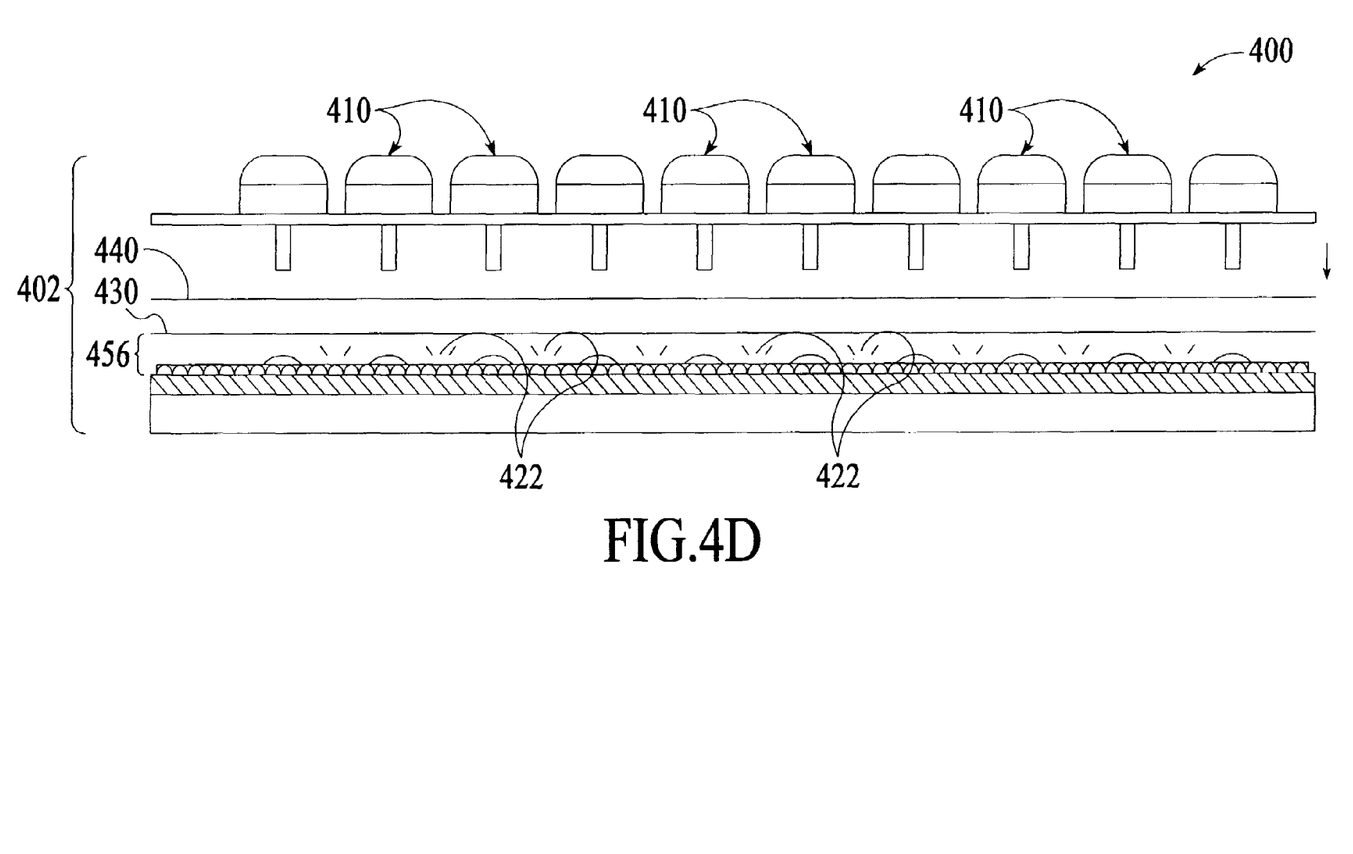

FIG. 4D illustrates disposition of the first polarization material 430 and the second polarization material 440 in a stack 402 of a keypad 400. In an embodiment shown, the first polarization material 430 and the second polarization material 440 are positioned within the stack 402 between the light sources 422 and an underside of the individual key structures 410.

In order for any polarization material to be effective, an implementation provides that each polarization material is provided a gap distance 456 from a light source (actual or apparent) that is to be distributed. For example, in one implementation, the suitable gap distance 456 is on the order of millimeters. When two or more polarization materials are used in the stack 402, each material may need to have a thickness separation (e.g. 2-4 millimeters).

With regard to embodiments described in FIG. 4A-4C, the degree of shift between the apparent and actual light sources may vary. For example, polarization materials may be used to provide a slight shift so that the apparent and actual light sources overlap substantially or slightly.

Additionally, three or more layers of polarization materials may be used, depending on design implementation. It should be noted that while use of polarization material described with FIG. 4A-4D provides for reflecting actual and apparent light sources as discrete sources, other embodiments may provide for using polarization material that diffuses and shifts and distributes light from one actual or apparent light source to another region.

Combination Lighting Layer

As described above, discrete light sources such as LEDs provide the benefit of brightness, which in turn provide better visibility and aesthetics of a key structure to a user. However, as also described, discrete light sources also provide shading, or hot/cold spots, unless the light emitted from such sources is treated in some manner. An alternative to LEDs and other forms of discrete light sources is a light source that emits light uniformly and evenly across a region that encompasses an entire keypad, or at least portions of the keypad on which lighting is desired. This type of lighting may be referred to as a lighting panel. A specific example of this kind of light source is an electroluminescent (EL) panel. While panel lighting has the benefit of providing uniform and distributed lighting, such lighting does not typically provide the same brightness as LEDs, at least not unless the amperage and size of the panel lighting is increased to be significantly greater than what would be required if only LEDs were to be employed.

Figure 5:
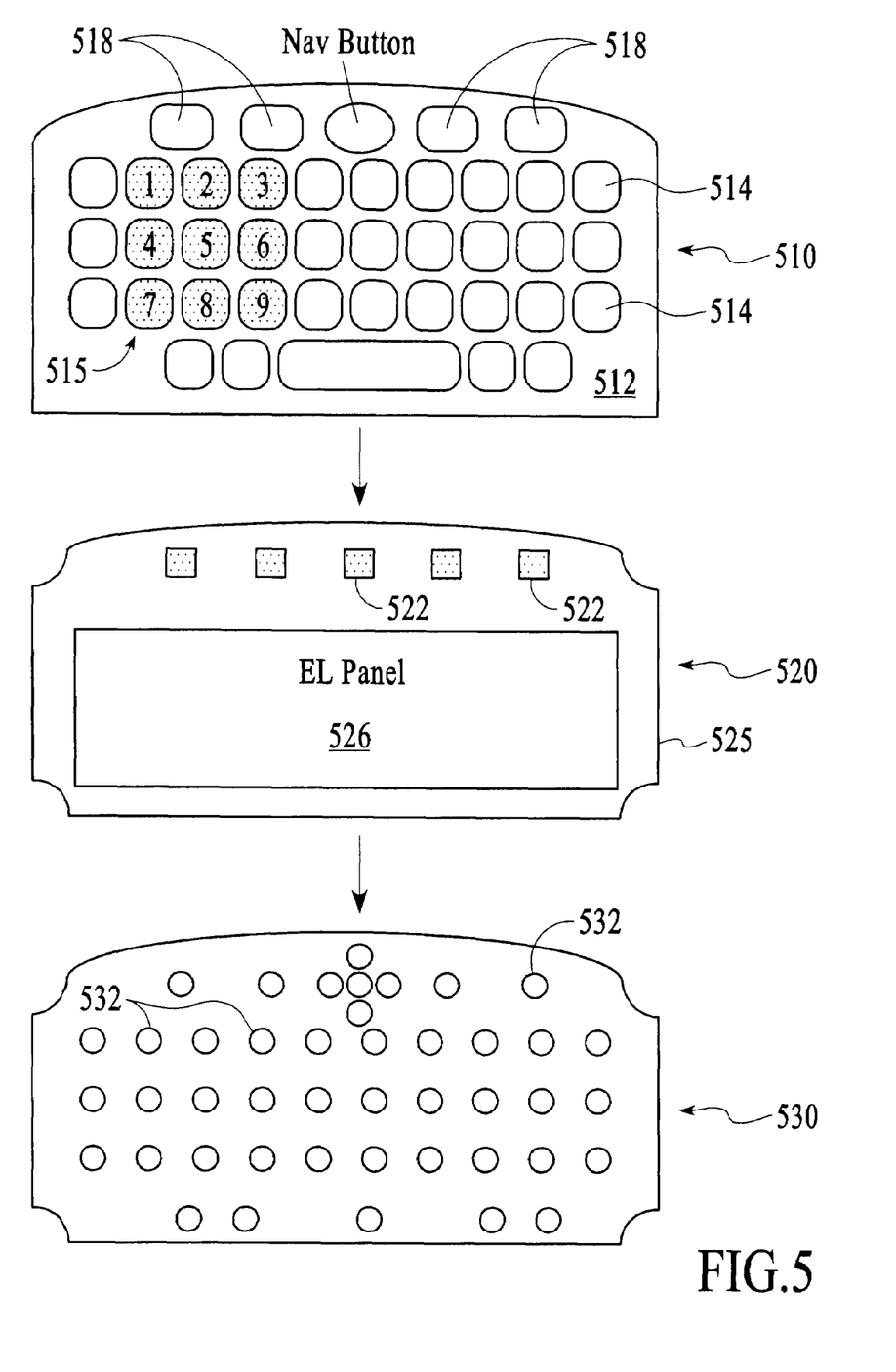
FIG. 5 illustrates an embodiment of the invention in which a lighting layer is configured to include a combination of panel lighting and discrete lighting.

Embodiments of the invention contemplate that a given keypad or keyboard design has some key structures that need bright lighting and other key structures that are adequately lit with panel lighting. Accordingly, FIG. 5 illustrates an embodiment of the invention in which a lighting layer is configured to include a combination of panel lighting and discrete lighting. In particular, FIG. 5 illustrates a keypad assembly comprising a key structure layer 510, a lighting layer 520 and a electrical contact layer 530. For purpose of simplicity, an embodiment shown by FIG. 5 is assumed to implement the plurality of key structures 510 as a monolithic structure. A carrier 512 or web may interconnect the key structures 514 of the key structure layer 510, although other implementations may provide for some or all of the key structures to be separated or in strips. Actuation members (not shown) may extend from a bottom surface (not shown) of each key structure 514 for purpose of enabling contact elements distributed over a substrate to be actuatable with insertion of the corresponding key structures. Additional materials may be added to the assembly, including materials for effecting usability of key structures and/or actuation members.

The key structures 514 may be arranged to provide one or more colored keys, keys with surface ornamentations and darkened appearances, and keys formed from different types of material. For example, in a small form-factor QWERTY keyboard, one embodiment provides for a shaded or colorized set of key structures 514, designated by a region 515, for purpose of indicating keys that have both numeric and alphabet values. Another implementation provides for the keypad to include specialized keys 518 that are colored are formed from more opaque material, such as application keys (for quick launching applications) or navigation keys (set for navigation by default).

In one embodiment, lighting layer 529 may include white LEDs that form discrete light sources distributed on a substrate 525 containing an EL panel 526. The LEDs are positioned strategically to conserve energy while lighting key structures that require the most light. In the example shown, the key structures that require the most light are the application keys 518, as they are colorized (e.g. red, green, and blue). As such, FIG. 5 provides LEDs 522 in alignment to backlight the application buttons 518. However, another embodiment may provide for using LEDs 522 to illuminate key structures in region 515. Other key structures 520 that are not colorized or otherwise darkened may be illuminated by the EL panel 526. In one embodiment, key structures illuminated by either light source may include milky material or layers, or have features of other embodiments described in this application. The substrate 525 holding the EL panel 526 may be a flex circuit (see FIG. 5B), which in turn is connected to the electrical contact layer 530. In one embodiment, EL panel 526 is tacked on to the flex circuit 525 to preserve electrical connectivity. Individual LEDs 522 are soldered onto the flex circuit 525. Elements of the electrical contact layer 530 may include individual snap dome contact switches 532 that actuate when collapsed by actuation members such as described elsewhere in this application.

Key Structure/Actuation Member Shaping

As shown, actuation members are elongated elements that travel in response to deflection or inward movement of corresponding key structures. The actuation members are used to convert key presses into switching events for electrical switches that underlie key structures. Typically, actuation members are cylindrical or even rectangular and extend downward from a bottom surface of a key structure.

In the context of lighting, the edged nature of actuation members are not conducive. The edges of actuation members reflect or divert light from the light sources, while better illumination results would result if such light was absorbed into the key structures and illuminated.

Figure 6A:
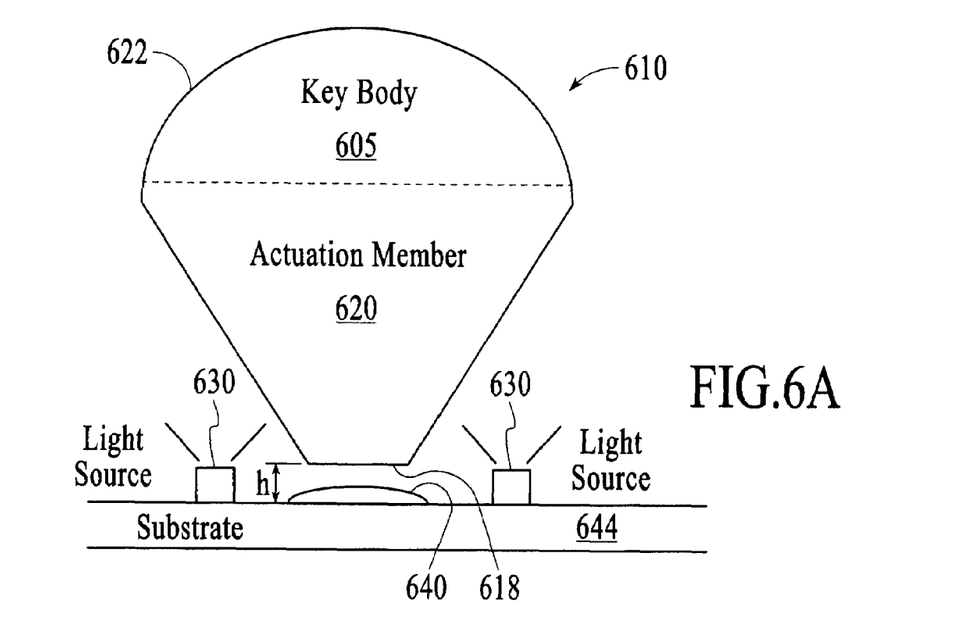
FIG. 6A, FIG. 6B, and FIG. 6C illustrate key structure designs for facilitating illumination, under an embodiment of the invention.

FIG. 6A is an enlarged view of a key structure 610 having a unitarily formed actuation member 620 that is shaped to receive and be transmissive to light, under an embodiment of the invention. The key structure 610 may include a key body 605 on which an exterior surface 622 is formed. The exterior surface 622 may be the surface from which an illumination effect is desired. Both the actuation member 620 and the key body 605 may be formed from translucent or milky material, so as to be able to receive light and to at least be partially transmissive to light. In an implementation, discrete light sources 630 may be positioned adjacent to the actuation member 620. The actuation member 620 may align over a contact element 640 provided on a substrate 644. The actuation member 620 includes a bottom surface 618 that is separated a distance h from the substrate. While FIG. 6A illustrates a separation distance h is about or less than a height of the light sources, the vertical position of the light sources on the substrate may vary. For example, the light sources may be embedded or flush with substrate 644.

According to an embodiment, a shape of actuation member 620 is conical, with exterior surface of the actuation member extending to or near the boundary of the key body 605. In the example provided, the key body is symmetrical and round, creating the cone shape. In other implementations, the key body 605 may be non-round (e.g. square or rectangular) or irregular in shape (trapezoidal). In such alternative implementations, the exterior surface of the actuation member 620 may conform to the shape or irregularity of the key body. For example, a square key body may result in a pyramid shaped actuation member 620, while an irregular shaped key body 605 may result in an uneven conical or tapered actuation member 620.

Figure 6B:
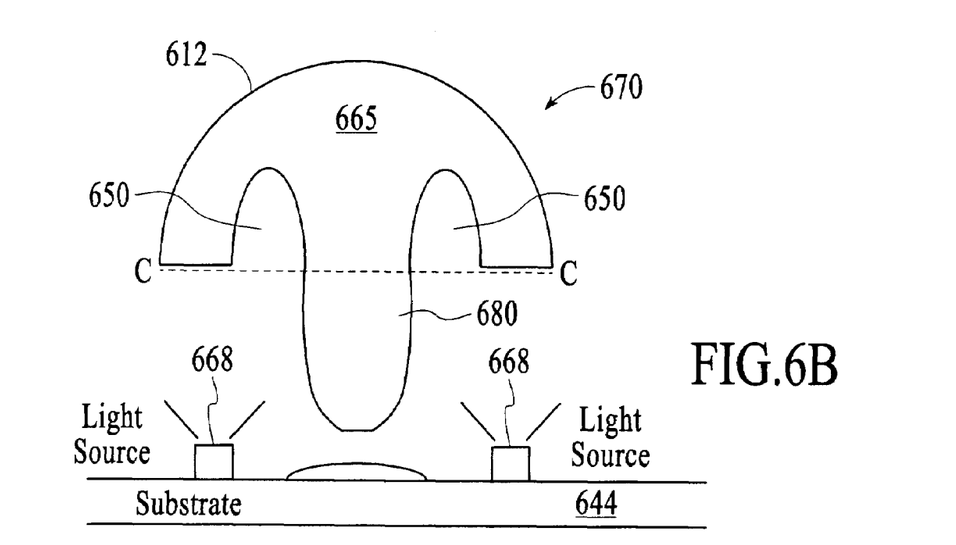
Figure 6C:
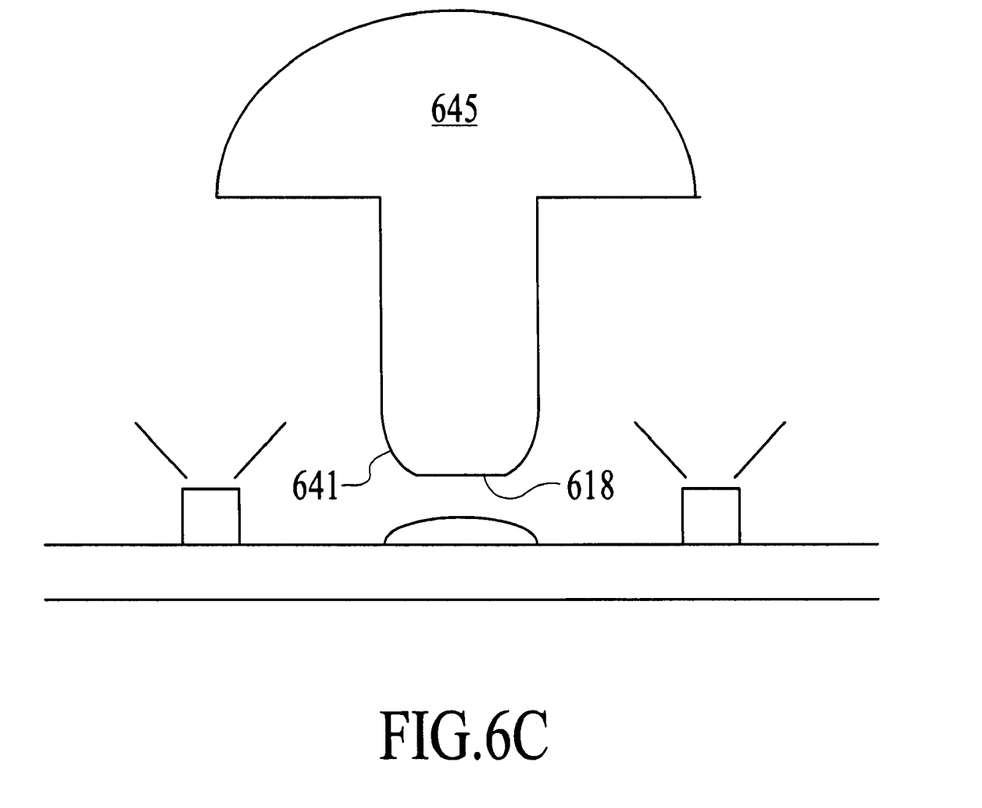

In FIG. 6A, the angled surface 621 forming the tapered section 625 is substantially linear and edged when joining the bottom end. FIG. 6C illustrates an alternative in which an angled surface 641 forming a tapered section 645 is rounded into the bottom end 618. Embodiments such as shown by FIG. 6A-6C illustrate actuation members that are shaped to better receive light from discrete light sources that are typically placed adjacent to the actuation members, rather than directly underneath. Embodiments such as shown by FIG. 6A illustrate that tapering the actuation member in whole (or at least in part) is conducive to reducing reflection from LEDs and other light sources that may disposed adjacent and below the actuation members.

FIG. 6B illustrates an alternative key structure 670 in which one or more open regions 650 are formed into the key body 665. The key body 665 may correspond to the portion of the key structure 670 that is provided over a line C-C (corresponding to the housing line on a computing device). In one embodiment, resin or matrix material (including possibly milky material) is removed from the key structure to form the open regions 650. The formation of open regions 650 means that more light from light sources 668 may enter the boundary of the key structure 670. An actuation member 680 may extend from the key body 605 to form the shape shown. One implementation provides that the actuation member 680 may be curved or irregular to accommodate the openings 650. The result is brighter and better illuminative effect on exterior surface 612 of the key structure 670, as there is less thickness for light to pass through in illuminating the key structure.

Embodiments shown with FIG. 6A-6B may incorporate key structure designs described with other embodiments and implementations in any combination. For example, with regard to the key structure 670 shown in FIG. 6B, an interior of the key structure 665 may be formed from milky resin or other matrix material. Alternatively, a paint layer may be provided somewhere on or within the key structure to diffuse light that enters the key structure. Furthermore, while the key structure may included the open regions 650, the actuation member 680 may be tapered, or include a tapered section, rounded or un-rounded, and otherwise be shaped to receive light rather than reflect light.

Carrier Slits

Figure 7:
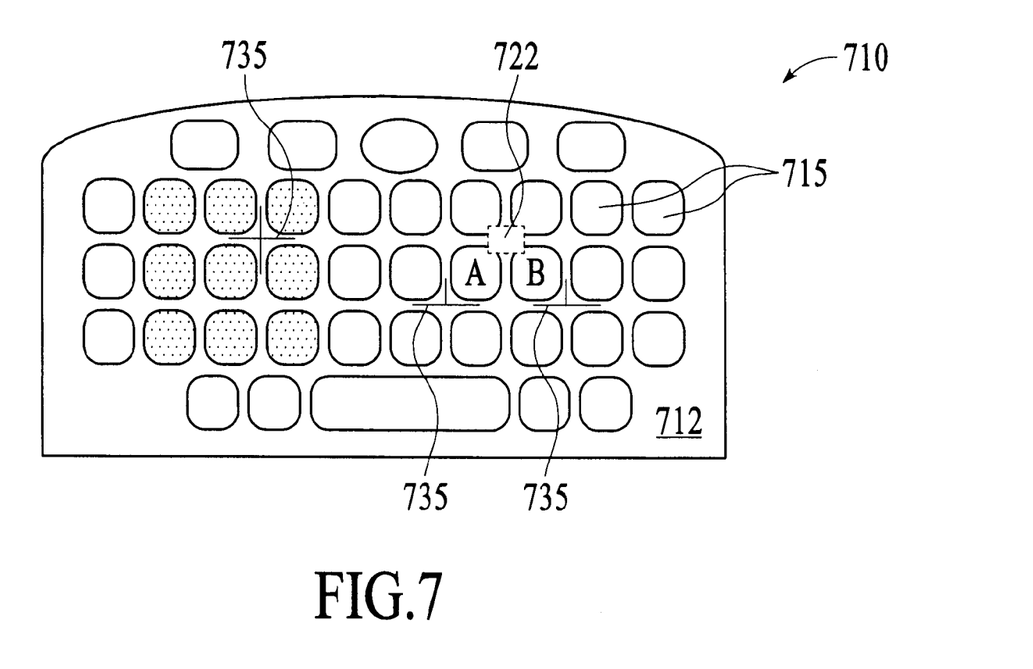
FIG. 7 illustrates a keypad with slits to facilitate key structure movement and minimize light leakage, under an embodiment of the invention.

To enhance the usability of a keyboard, it is desirable to lessen the restriction of movement of individual key structures when such structures are deflected and/or pushed inward by the user. FIG. 7 is a top view of a key structure layer, such as may be provided by any of the embodiments described above. The key structure layer 710 may include a plurality of key structures 715, provided in a QWERTY arrangement. A carrier 712 may provide a web that joins the structures. The carrier 712 may carry tension from the number of key structures 715 carried on it. The tension may provide unwanted resistance and guidance to the user when deflecting or pushing key structures inward. To lessen the tension, a slit pattern 735 may be formed on the carrier 712.

In FIG. 7, the position of a single light source 722 is shown underneath the carrier 712. The light source 722 may be provided between four key structures 715. One problem that may arise in forming slits into the carrier 712 is that the presence of the light source may cause light leakage through those slits. Light leakage is distracting and unaesthetic, thus preferably avoided. Accordingly, one embodiment shapes and forms light slits 735 on the carrier 712 to minimize the light leakage. This requires consideration of the position of the light source 722. One implementation provides that slits are provided about each key stroke in "L" or adjoining linear segments to form corners about individual key structures, where the corners are distal to the light source for that key stroke. When adjoining key structures are considered, the resulting shape may correspond to an upside down "T". Thus, for example, the key structures 715 labeled as "A" and "B" are provide corner slits 735 which serve to hinge each of those key structures on carrier 712 the non-slit side of the respective key structures. However, with respect to the light source 722, the position of the slits 735 is sufficiently distal to avoid light leakage. Thus, slits 735 are formed adjacent to a corner of a key structure most distal to an underlying light source. As such, the pattern of the light sources 720 underlying the key structure layer 710 may be determinative of the slit pattern and its position.

It should be noted that darkened and/or colored keys fair worst with light leakage. Light emitting from dark keys is more distracting to a user. Many factors, including key shape and distance to the proximate light sources, need to be considered in forming slits around on darkened keys of a keyboard.

Alternative embodiments may use strips or sections to form the key structure layer of a keyboard stack. Sectioning an otherwise monolithic keyboard into segments reduces the amount of tension that surrounds individual keys as a result of the weight and presence of other key structures formed on a common carrier. For example, in a QWERTY keyboard, each row of key structures may be provided on a separate strip, and the stripped sections may be combined in assembly to form the keyboard. Alternatively, multiple key structures may be formed on "L" or "C" shaped sections, which are then intertwined at assembly to form the monolithic keyboard. While sectioning keyboards for assembly can reduce tension on the carrier and thus enhance usability, the gaps caused by the sectioning also produce light leakage. As such, a balance between the number of sections and the amount of tolerable light leakage may be struck, based on the particular implementation.

Dampening Layer

One or more embodiments may implement a dampening layer in connection with use of actuation members traveling into contact members. Embodiments described in this section may be implemented independently of other embodiments provided with this application. For example, a dampening layer, such as described with FIG. 8A-8C, may be used with a keyboard that includes no lighting element. Alternatively, however, a keyboard stack having features described in this section may also implement lighting features of other embodiments described elsewhere in this application.

Figure 8A:
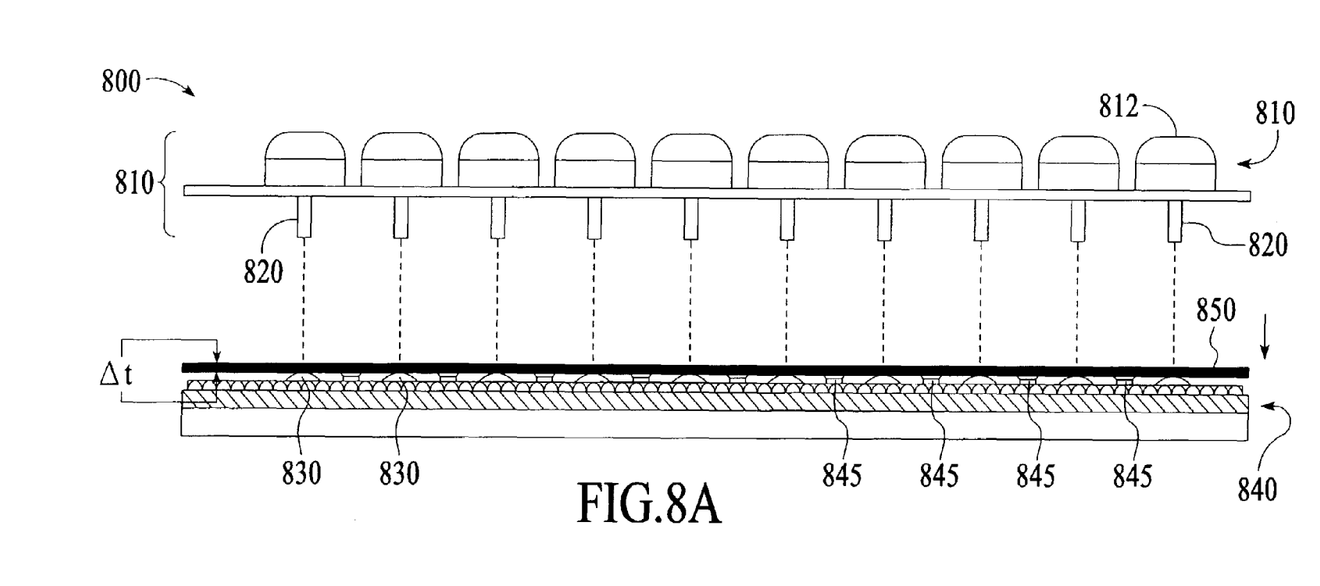
FIG. 8A-8C illustrate use of a dampening layer inside a keypad stack, under an embodiment of the invention.

FIG. 8A illustrates a keyboard stack assembled to include a dampening layer, under an embodiment of the invention. The keyboard stack 802 may include a plurality of key structures layer 810 with actuation members 820 extending downward from individual key structures 812. The dampening layer 850 may correspond to a layer of deformable or flexible material. According to an embodiment, a dampening layer 850 may be overlaid on top of electrical contacts 830 distributed over a substrate 840 having a plurality of electrical contacts 830 that are actuatable by actuation members 820. One effect achieved by the dampening layer 850 is that it cushions and protects the electrical contacts 830 from jarring forces to the housing of the computing device, or from forceful movements of the actuation members use and shock of the housing that contains the keyboard assembly 800.

In an embodiment, the dampening layer 850 is provided over the electrical contacts 830 (FIG. 8C) of the substrate 840. In an implementation in which lighting is provided, one embodiment provides for discrete light sources, such as LEDs, to be provided on the substrate 840 and overlaid by the dampening layer 850. As described with FIG. 2A-2C, the dampening layer 850 may be milky, or alternatively translucent, to enable the light sources 845 to backlight the key structures 812.

An overall thickness t of the dampening layer may be thin, of the order of less than one millimeter. In one embodiment, the thickness t of the dampening layer is less than 0.5 millimeter. In one specific implementation, the thickness t of the dampening layer is about (within 90%) of 0.25 millimeters. As mentioned, a suitable material for the dampening layer is silicon rubber. In such an implementation, the lighting sources 845 may correspond to light pipes or white LEDs.

Figure 8B:
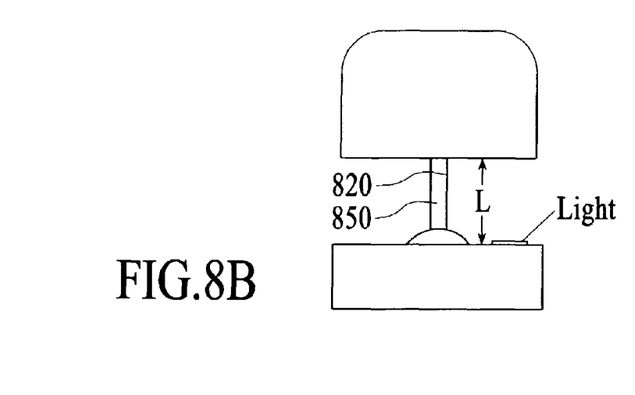
Figure 8C:
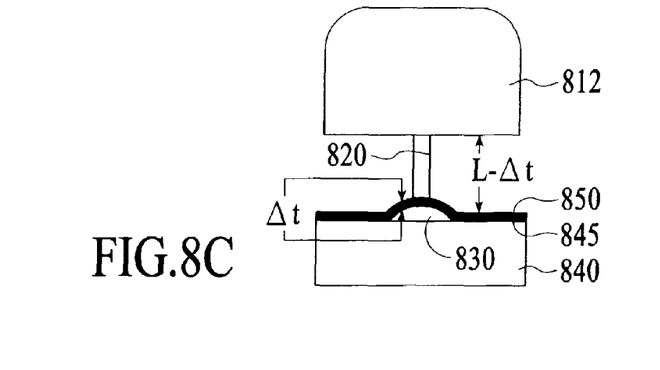

FIG. 8B illustrates a key structure 812 without use of the dampening layer. In such a design, the actuation member has length L. FIG. 8C shows a comparison of the dampening layer 850 overlaid onto the electrical contact 830. To accommodate the extra thickness of the dampening layer 850, one embodiment provides for the actuation member 820 to be reduced in length L by the thickness t of the dampening layer. Insertion or deflection of key structure 812 causes actuation member 820 to travel and actuate the contact element 830. In one embodiment, the electrical contact element 830 is a snap dome, and the dampening layer 850 dampens the impact of the actuation member 820 (which may be formed from hard plastic) with the electrical contact element 830. Among other added benefits, the dampening layer 850 may reduce the noise and tactile response of the snap dome contact element, thus eliminating or reducing "clicking". Furthermore, when the computing device is dropped, the snap dome contact element is less likely to be pierced or made dysfunctional by the rigid actuation member.

Although illustrative embodiments of the invention have been described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mentioned of the particular feature. This, the absence of describing combinations should not preclude the inventor from claiming rights to such combinations.

What is claimed is:

1. A keyboard for a mobile computing device, the keyboard comprising:
    a plurality of key structures, each of the plurality of key structures being referenced by a top end that includes a surface for receiving user-contact and a bottom end opposite to the top end, the plurality of key structures being distributed on a face of the mobile computing device to form the keyboard;
    a plurality of discrete light sources provided underneath the plurality of key structures, the plurality of light sources illuminating the key structures from the bottom end;
    a milky material provided between the top of at least some of the key structures of the plurality of key structures and the plurality of discrete light sources in order to enable light generated by the plurality of light sources to pass through the associated key structures; and
    wherein at least some of the plurality of discrete light sources are aligned under and adjacent to one or more of the plurality of key structures.

2. The keyboard of claim 1, wherein the milky material is provided within each of the plurality of key structures.

3. The keyboard of claim 1, wherein the milky material is a resin that forms each of the plurality of key structures.

4. The keyboard of claim 3, wherein the resin is substantially white.

5. The keyboard of claim 1, wherein the milky material is provided as a separately formed layer between the plurality of key structures and the plurality of light sources.

6. The keyboard of claim 1, wherein the plurality of discrete light sources correspond to a plurality of light emitting diodes.

7. The keyboard of claim 1, farther comprising a carrier layer that interconnects the plurality of key structures with the bottom end.

8. The keyboard of claim 1, wherein each of the associated of key structures includes a surface film that forms an exterior of the key structure, and wherein the milky material forms an interior of the key structure.

9. The keyboard of claim 1, wherein the plurality of key structures includes a first set of key structures that are substantially different in appearance than a remainder of the plurality of key structures, and wherein the first set of key structures are visually differentiable from the remainder of key structures in part by the light illuminated from the plurality of discrete light sources.

10. The keyboard of claim 9, wherein each of the first set of key structures is adjacent to one another.

11. The keyboard of claim 9, wherein the first set of key structures are of a different color than the rest of the plurality of key structures.

12. The keyboard of claim 9, wherein the first set of key structures are formed from a different type of material than the rest of the plurality of key structures.

13. The keyboard of claim 9, wherein the first set of key structures include substantially different surface ornamentations than the rest of the plurality of key structures.

14. The keyboard of claim 13, wherein each of the first set of key structures is designated to provide a numerical input value.

15. The keyboard of claim 9, wherein each of the first set of key structures is substantially similar in appearance.

16. The keyboard of claim 9, wherein the light passing through each of the first set of key structures differs from the light passing through the rest of the plurality of key structures in at least one of: (i) color or (ii) intensity.

17. The keyboard of claim 16, wherein the discrete light sources are substantially concentrated below the first set of key structures.

18. The keyboard of claim 17, farther comprising a lighting panel provided underneath the plurality of key structures, the lighting panel uniformly illuminating at least the rest of the plurality of key structures.

19. The keyboard of claim 18, wherein the lighting panel corresponds to an electroluminescent panel.

20. The keyboard of claim 1, wherein at least some of the plurality of discrete light sources are aligned directly under one or more of the plurality of key structures.

* * * * *